United States Patent
Lee (10) Patent No.: US 8,046,344 B2
(45) Date of Patent: Oct. 25, 2011

(54) METHOD FOR AUTOMATICALLY SEARCHING FOR INFORMATION AND VIDEO APPARATUS USING THE SAME

(75) Inventor: Tae-dong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 11/968,715

(22) Filed: Jan. 3, 2008

(65) Prior Publication Data
US 2009/0024625 A1      Jan. 22, 2009

(30) Foreign Application Priority Data
Jul. 16, 2007 (KR) .................. 10-2007-0071369

(51) Int. Cl.
*G06F 17/30* (2006.01)
(52) U.S. Cl. ............................................. 707/706
(58) Field of Classification Search .......... 707/3, 102, 707/706; 705/14
See application file for complete search history.

(56) References Cited

U.S. PATENT DOCUMENTS

| | | | |
|---|---|---|---|
| 5,995,921 A | 11/1999 | Richards | |
| 6,519,585 B1 | 2/2003 | Kohli | |
| 2002/0059180 A1* | 5/2002 | Aoki et al. | 707/1 |
| 2005/0010582 A1* | 1/2005 | Saito et al. | 707/100 |
| 2005/0028156 A1 | 2/2005 | Hammond et al. | |
| 2005/0261962 A1* | 11/2005 | Chuah | 705/14 |
| 2005/0267994 A1* | 12/2005 | Wong et al. | 709/246 |
| 2006/0173888 A1* | 8/2006 | Narahara et al. | 707/102 |
| 2007/0061299 A1* | 3/2007 | Chisaka | 707/3 |

FOREIGN PATENT DOCUMENTS

| | | |
|---|---|---|
| EP | 1318672 A1 | 12/2001 |
| EP | 1592237 A2 | 4/2005 |

OTHER PUBLICATIONS

Merriam-Webster OnLine Dictionary.*
Communication dated Jul. 6, 2010, issued by the European Patent Office in counterpart European Application No. 08153644.3-1225.

* cited by examiner

*Primary Examiner* — Etienne Leroux
(74) *Attorney, Agent, or Firm* — Sughrue Mion, PLLC

(57) ABSTRACT

An automatic search method and a video apparatus using the method are provided. According to the automatic search method, the video apparatus deletes characters satisfying specific conditions from additional information which is received, and generates keywords. Therefore, a user may acquire search results without needing to directly input keywords, and it is possible to prevent undesired information from being displayed as a search result.

21 Claims, 4 Drawing Sheets

METHOD FOR AUTOMATICALLY SEARCHING FOR INFORMATION AND VIDEO APPARATUS USING THE SAME

CROSS-REFERENCE TO RELATED APPLICATIONS

This application claims priority from Korean Patent Application No. 10-2007-0071369, filed on Jul. 16, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to automatically searching for information, and more particularly, to automatically searching for information desired by a user.

2. Description of the Related Art

Users have obtained access to vast amounts of information as a result of the growth of the Internet and the World Wide Web. In particular, search engines with excellent performance have enabled users to easily search for information, and have also provided users with richer and more accurate information.

Users need to input keywords individually using keyboards or other input means in order to search for desired information, thereby increasing user inconvenience.

Therefore, there is a need for methods for searching for information desired by users without the user's direct input as described above. Additionally, there is a need for methods for obtaining search results including only information desired by users, and excluding information which users do not desire to obtain.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an automatic search method for filtering predetermined characters from additional information received from an external source, generating keywords and searching for information using the keywords, so that a user may obtain search results without direct keyword input and so it is possible to prevent undesired information from being displayed as a search result, and a video apparatus using the method.

According to an aspect of the present invention, there is provided an automatic search method comprising receiving additional information; deleting characters satisfying specific conditions from the received additional information, and generating keywords; and searching for information associated with the generated keywords.

The deleting may comprise deleting characters which have no connection with the subject of the additional information from the additional information, and generating keywords.

The additional information may comprise information on a broadcast program. The deleting may comprise deleting characters which have no connection with the title of the broadcast program from the additional information, and generating keywords.

The additional information may comprise information contained in an event information table (EIT).

The deleting may comprise deleting at least one of special characters; alphanumeric characters arranged next to the special characters; alphanumeric characters between a pair of special characters; characters which may optionally be enclosed in parentheses indicating the image quality of the broadcast program; and characters indicating the start time of the broadcast program, from the additional information, and generating keywords.

The image quality of the broadcast program may be indicated by at least one of FULL high definition (HD) and standard definition (SD).

The searching may comprise generating a search request message containing the keywords; transmitting the search request message to a search server accessible via a network; and receiving a search result for the keyword from the search server.

The network may be the Internet. The search server may provide web pages for searching.

The receiving the additional information, generating the keywords and searching for the information may be performed by a video apparatus. The video apparatus may function as a web client with respect to the search server.

The additional information may comprise information on a broadcast program. The method may further comprise receiving the broadcast program through a medium differing from the network.

According to another aspect of the present invention, there is provided a video apparatus comprising a receiver which receives additional information from an external source; and a controller which deletes characters satisfying specific conditions from the additional information received by the receiver, generates keywords, and searches for information associated with the generated keywords.

The controller may delete characters which have no connection with the subject of the additional information from the additional information, and may generate keywords.

The additional information may comprise information related to a broadcast program. The controller may delete characters which have no connection with the title of the broadcast program from the additional information, and may generate keywords.

The additional information may comprise information contained in an event information table (EIT).

The controller may delete at least one of special characters; alphanumeric characters arranged next to the special characters; alphanumeric characters between a pair of special characters; characters which may optionally be enclosed in parentheses indicating the image quality of the broadcast program; and characters indicating the start time of the broadcast program, from the additional information, and may generate keywords.

The image quality of the broadcast program may be indicated by at least one of FULL HD, HD and SD.

The video apparatus may further comprise a communication interface which is communicably connected to an external network. The controller may generate a search request message containing the keywords, may transmit the search request message to a search server accessible via the network connected to the communication interface, and may receive a search result for the keyword from the search server.

The network may be the Internet. The search server may provide web pages for searching.

The video apparatus may function as a web client with respect to the search server.

The additional information may comprise information on a broadcast program. The video apparatus may receive the broadcast program through a medium different from the network.

According to another aspect of the present invention, there is provided a program capable of performing the functions of receiving additional information; deleting characters satisfying specific conditions from the received additional information, and generating keywords; and searching for information associated with the generated keywords.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 1:
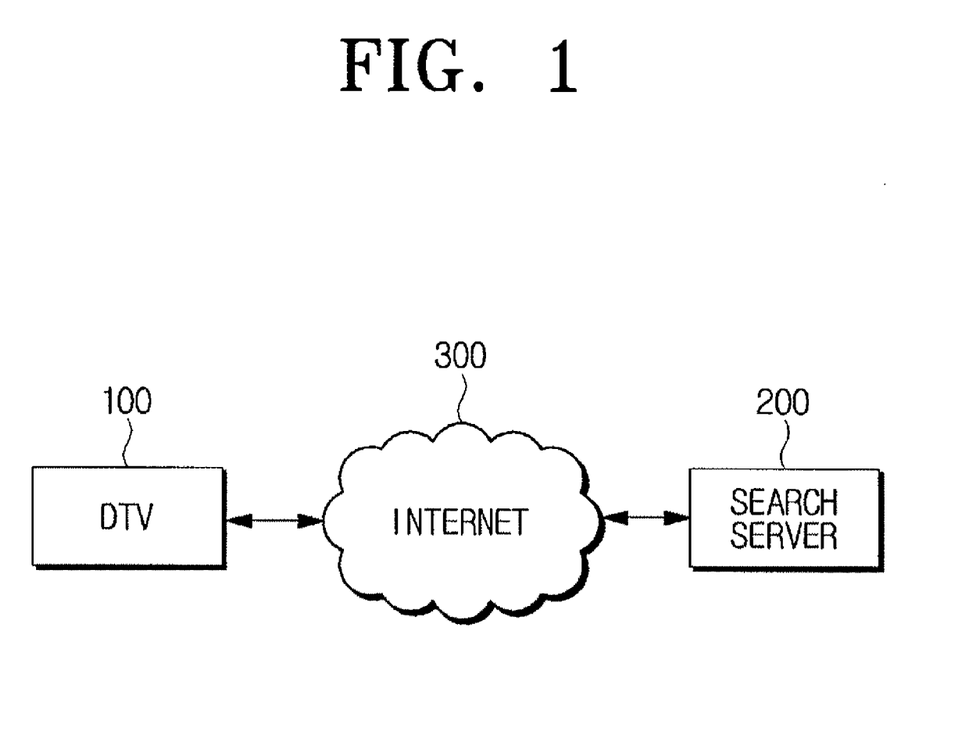
FIG. 1 is a diagram showing an automatic search system to which the exemplary embodiment of the present invention is applicable.

FIG. 1 is a diagram showing an automatic search system to which the exemplary embodiment of the present invention is applicable. The automatic search system of FIG. 1 is configured by connecting a DTV 100 and a search server 200 via the Internet 300 to enable mutual communication.

The DTV 100 is used as a broadcast receiving apparatus which receives a broadcast program and provides a user with the received broadcast program. The DTV 100 requests that the search server 200 connected via the Internet 300 search for broadcast program information over the Internet. Additionally, the DTV 100 provides the user with an Internet search result received from the search server 200 on a screen in response to the request.

Since the DTV 100 requests that the search server 200 conduct the Internet search for the broadcast program information through the Internet 300, the DTV 100 may function as a web client.

Alternatively, the search server 200 may function as a web server, which provides web pages for an Internet search and sends the Internet search result to the DTV 100 via the Internet 300.

Figure 2:
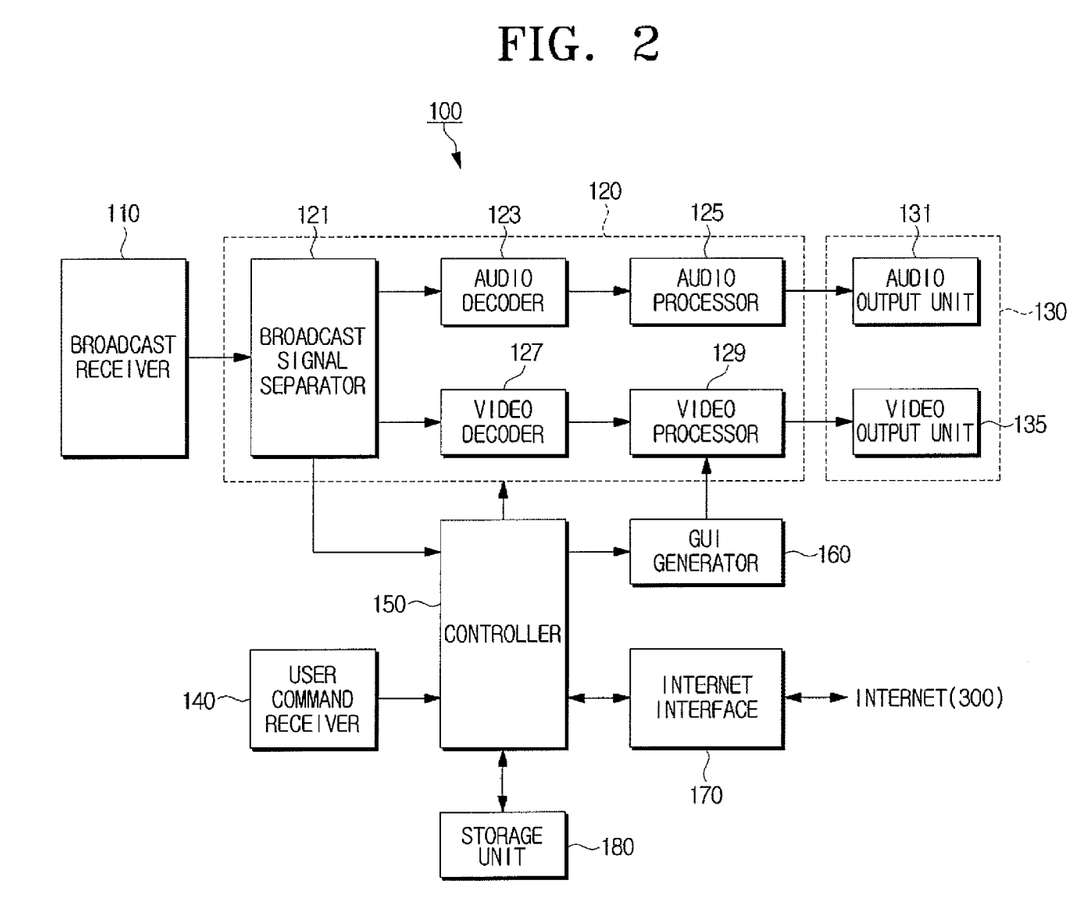
FIG. 2 is a detailed block diagram showing a digital television (DTV) shown in FIG. 1.

Hereinafter, the DTV 100 of FIG. 1 will be described in detail with reference to FIG. 2. FIG. 2 is a detailed block diagram showing the DTV 100 shown in FIG. 1.

In FIG. 2, the DTV 100 comprises a broadcast receiver 110, a broadcast processor 120, a broadcast output unit 130, a user command receiver 140, a controller 150, a graphical user interface (GUI) generator 160, an Internet interface 170 and a storage unit 180.

The broadcast signal receiver 110 tunes to one of a plurality of broadcasts received wirelessly by radio, and demodulates the tuned broadcast.

The broadcast processor 120 performs signal processing with respect to the broadcast signal output from the broadcast signal receiver 110. The broadcast processor 120 functioning as described above comprises a broadcast signal separator 121, an audio decoder 123, an audio processor 125, a video decoder 127 and a video processor 129.

The broadcast signal separator 121 separates the broadcast signal output from the broadcast signal receiver 110 into a video signal, an audio signal and additional data, and outputs the separated signals and additional data. The audio signal and the video signal separated from the broadcast signal are transferred to the audio decoder 123 and the video decoder 127, respectively, to be used in providing a digital broadcast program.

The additional data separated from the broadcast signal is transferred to the controller 150. The additional data may be program and system information protocol (PSIP) information. The PSIP information comprises an event information table (EIT) including information on broadcast programs. Specifically, the EIT comprises information regarding the title, image quality and start time of the broadcast program.

For example, if the broadcast program is displayed at a high definition, the EIT may contain alphabetic characters, namely HD, which may optionally be enclosed in parentheses as [HD], to indicate the high definition.

Additionally, if the broadcast program begins at 6:00 pm on June 25, a character string such as "#June 25, 6:00" including a mixture of alphanumeric characters and a special character, #, may be included in the EIT in order to indicate the start time of the broadcast program.

Furthermore, if a documentary on Samsung is broadcast at a high definition at 6:00 pm on June 25, the broadcast program information contained in the EIT may be "[HD] Samsung Documentary #June 25, 6:00".

The audio decoder 123 decodes the audio signal output from the broadcast signal separator 121, and may output the decoded audio signal.

The audio processor 125 converts the decoded audio signal output from the audio decoder 123 into an audio signal of a format suitable to be played through a speaker of the DTV 100.

The video decoder 127 decodes the video signal output from the broadcast signal separator 121, so that the decoded video signal can be output.

The video processor 129 converts the decoded video signal output from the video decoder 127 into a video signal of a format suitable to be displayed on a display of the DTV 100. In order to achieve this, the video processor 129 performs color signal processing and scaling with respect to the decoded video signal.

The GUI generator 160 generates a GUI to be shown on the display. The GUI generated by the GUI generator 160 is transferred to the video processor 129, and is then added to video to be displayed on the display.

The broadcast output unit 130 outputs video and audio corresponding to the video signal and the audio signal output from the broadcast processor 120, and thereby provides a user with the video and audio. The broadcast output unit 130 comprises an audio output unit 131 and a video output unit 135.

The audio output unit 131 may output the audio signal transmitted from the audio processor 125 through the speaker, or may output the audio signal to an output display (for example, an external TV) which is connected to an external output terminal.

The video output unit 135 may output the video signal transmitted from the video processor 129 through the display, or may output the video signal to an output display (for example, an external TV) which is connected to an external output terminal.

The Internet interface 170 is connected to the search server 200 via the Internet 300 so that mutual communication may be performed.

The user command receiver 140 transfers user commands received from a remote controller to the controller 150. The controller 150 controls the entire operation of the DTV 100 in response to the user commands received from the user command receiver 140. The storage unit 180 stores a program, data and information which are required when the controller 150 controls the operations of the DTV 100.

The controller 150 controls the broadcast receiver 110, broadcast processor 120 and broadcast output unit 130 so that a broadcast can be received in response to the user command and displayed on a screen.

If a user inputs a command to search for information on the broadcast program on the Internet while viewing the broadcast program, the controller 150 may request that the search server 200 connected via the Internet interface 170 search for information on the broadcast program being broadcast over the Internet. The controller 150 may then provide the user with the Internet search result received from the search server 200 as a response to the request on the screen.

When the Internet search for the broadcast program information is requested, the controller 150 transfers keywords to the search server 200. In this situation, the controller 150 filters predetermined characters from a character string contained in the EIT, and then generates keywords for the broadcast program.

Figure 3:
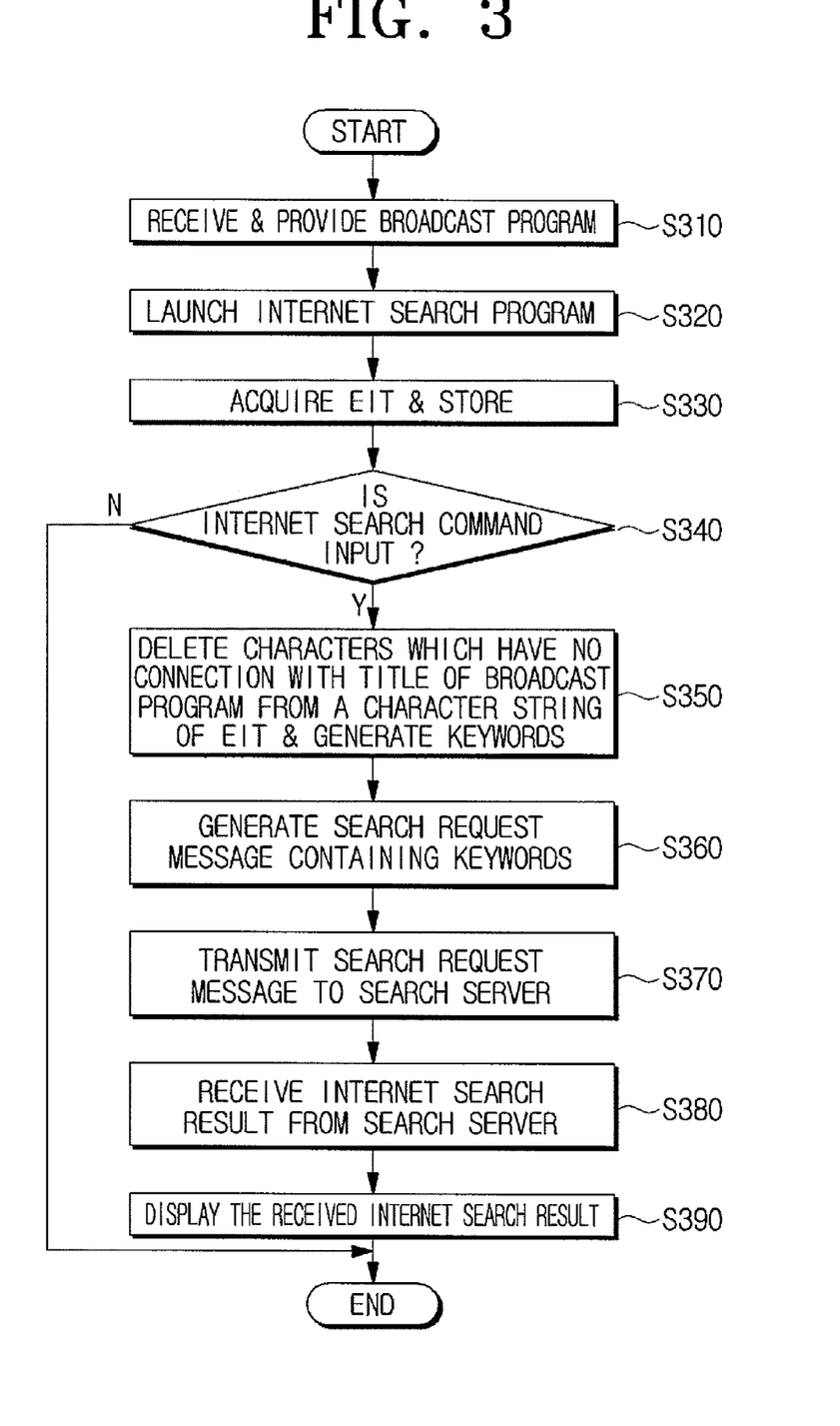
FIG. 3 is a flowchart explaining an automatic search method according to an exemplary embodiment of the present invention.

Hereinafter, a process by which the controller 150 generates keywords for a broadcast program using the EIT, searches the Internet using the generated keywords and thereby provides a user with an Internet search result will be described in detail with reference to FIG. 3. FIG. 3 is a flowchart explaining an automatic search method according to an exemplary embodiment of the present invention.

As shown in FIG. 3, the DTV 100 receives a broadcast program and provides a user with the received broadcast program (S310). Specifically, in operation S310, the broadcast receiver 110 tunes to a broadcast signal and demodulates the tuned broadcast signal; the broadcast processor 120 performs signal processing with respect to the broadcast signal output from the broadcast signal receiver 110; and the broadcast output unit 130 outputs video and audio corresponding to the video signal and the audio signal output from the broadcast processor 120, and provides a user with the video and audio.

The controller 150 launches an Internet search program (S320). The Internet search program is a program used to perform operations S330 to S390. In more detail, the Internet search program may be a program used to generate keywords for a broadcast program using the EIT, transfer the generated keywords to the search server 200 via the Internet interface 170 and display an Internet search result received via the Internet interface 170 from the search server 200 on a screen, thereby providing a user with the Internet search result.

The controller 150, which launches the Internet search program (hereinafter, referred to as "the controller 150"), acquires the EIT from the PSIP information separated from the broadcast signal received in operation S310, and stores the acquired EIT in the storage unit 180 (S330). As described above, the EIT is a table containing information on broadcast programs, such as the title, image quality and start time of the broadcast program.

The user may command the DTV 100 to search for information on the broadcast program on the Internet, that is, to perform an Internet search, while viewing the broadcast program provided in operation S310. In the exemplary embodiment of the present invention, the Internet search means that searching for information regarding broadcast programs is performed on the Internet. Additionally, the user may input a command to perform the Internet search using a predetermined key of the remote controller or using the GUI shown on the screen by the GUI generator 160.

If the Internet search command is input (S340-Y), the controller 150 may delete characters which have no connection with the title of the broadcast program from the character string contained in the EIT, and may thus generate keywords (S350).

Specifically, in operation S350, the controller 150 may delete characters representing the image quality of the broadcast program from the character string contained in the EIT. For example, the controller 150 may remove alphabetic characters, such as HD, indicating the image quality of the broadcast program, or parentheses and alphabetic characters between the parentheses, such as [HD], also indicating the image quality of the broadcast program, from the character string contained in the EIT.

Additionally, the controller 150 may delete characters representing the start time of the broadcast program from the character string contained in the EIT. For example, in the case of character string "#June 25, 6:00" in the EIT, the controller 150 may remove alphanumeric characters indicating the start time of the broadcast program, namely, June 25, 6:00, and special character, namely #, from the character string.

Accordingly, the keywords generated in operation S350 comprise only characters related to the title of the broadcast program. For example, if the character string indicating the broadcast program information contained in the EIT stored in the storage unit 180 are represented as "[HD] Samsung Documentary #June 25, 6:00", the controller 150 may delete [HD] and #June 25, 6:00 in operation S350, and so only "Samsung Documentary" remains. Accordingly, the remaining portion "Samsung Documentary" may be the keyword for the broadcast program.

The controller 150 generates a search request message containing the keywords generated in operation S350 (S360). The controller 150 then transmits the generated search request message to the search server 200 using the Internet interface 170 (S370). The generation of the search request message in operation S360 and the transmission of the search request message in operation S370 may be by HyperText Transfer Protocol (HTTP). This is because the DTV 100 is connected to the search server 200 via the Internet 300.

The search server 200 searches for the Internet using the keywords transmitted from the controller 150 in operation S370.

The controller 150 receives the Internet search result from the search server 200 via the Internet interface 170 (S380). Since the search request message is generated in operation S360 and is transmitted in operation S370 by HTTP, the Internet search result is also received by HTTP.

The controller 150 displays the received Internet search result on the screen, to provide the user with the Internet search result (S390). In operation S390, the controller 150 controls the GUI generator 160 to display the Internet search result received in operation S380 on the screen.

The process of removing predetermined characters from the EIT, generating keywords for the broadcast program and searching the Internet using the generated keywords was described above in detail, according to the exemplary embodiment of the present invention.

Although the keywords are generated from the character string contained in the EIT in this exemplary embodiment of the present invention, the EIT is merely exemplary to facilitate understanding of the present invention. Accordingly, the present invention is applicable to a situation in which keywords are generated from a character string contained in various types of additional information on the broadcast programs, instead of the EIT.

In this situation, other types of additional information may not necessarily be received together with broadcast programs in the same manner as the EIT. In other words, the additional information may be received separately from the broadcast programs through a medium such as radio by which the broadcast programs are received, or may be received through a medium such as the Internet differing from the medium by which broadcast programs are received. Accordingly, those skilled in the art may easily implement the present invention.

Additionally, in this exemplary embodiment of the present invention, only HD has been described as the image quality of the broadcast program to facilitate understanding of the present invention, but the present invention may be applied to cases of FULL HD, HD and standard definition (SD).

Furthermore, in this exemplary embodiment of the present invention, the additional information which has no connection with the title of the broadcast program contained in the EIT comprises information on the image quality and start time of the broadcast program, but the present invention is not limited to such information. The additional information which has no connection with the title of the broadcast program may be identified by alphanumeric characters arranged next to special characters, or by alphanumeric characters between a pair of special characters.

Accordingly, the controller 150 may delete from the character string contained in the EIT special characters, alphanumeric characters arranged next to special characters, alphanumeric characters between a pair of special characters, or characters satisfying specific conditions, so that keywords may be automatically generated.

Special characters may include !, @, $, %, ^, &, *, _, -, =. +, |, W, /, ?, , or ., in addition to #. Other examples of the pair of special characters may include [ . . . ], { . . . }, ( . . . ), < . . . >, / . . . /, " . . . " or ' . . . '.

In this exemplary embodiment of the present invention, the storage unit 180 may store Internet search results for various broadcast programs, so a user may read the stored Internet search results at any time.

The DTV 100 is connected to the search server 200 via the Internet 300 in this exemplary embodiment of the present invention, but other media connected between the DTV 100 and the search server 200 may be used instead of the Internet 300. Therefore, the DTV 100 may be connected to the search server 200 via other kinds of network, such as a local area network (LAN).

The exemplary embodiment of the present invention may be applied to a situation in which a user may search for information on broadcast programs using other networks or using a database, which is written and maintained by the networks, instead of the Internet.

Although the broadcast receiving apparatus to which the exemplary embodiment of the present invention is applicable is constituted by the DTV 100, in order to facilitate understanding of the exemplary embodiment of the present invention, the exemplary embodiment of the present invention is applicable to other broadcast receiving apparatuses instead of the DTV 100. Besides the DTV 100, broadcast receiving apparatuses may include a set-top box (STB) or a digital multimedia broadcasting (DMB) receiver, or any of various types of portable devices, such as a mobile phone, a navigation device or a personal multimedia player (PMP), having a broadcast receiving function. Additionally, other video apparatuses (namely, apparatuses without the broadcast receiving function), excluding broadcast receiving apparatuses, may also be used instead of the DTV 100.

Additionally, although information searched for using the Internet in this exemplary embodiment of the present invention is information on broadcast programs, various other types of information may be searched for. Accordingly, the exemplary embodiment of the present invention may be applied to a situation in which information regarding other targets is searched for over the Internet, instead of broadcast programs.

Hereinafter, another exemplary embodiment of the present invention will be described in detail with reference to FIGS. 4 and 5.

Figure 4:
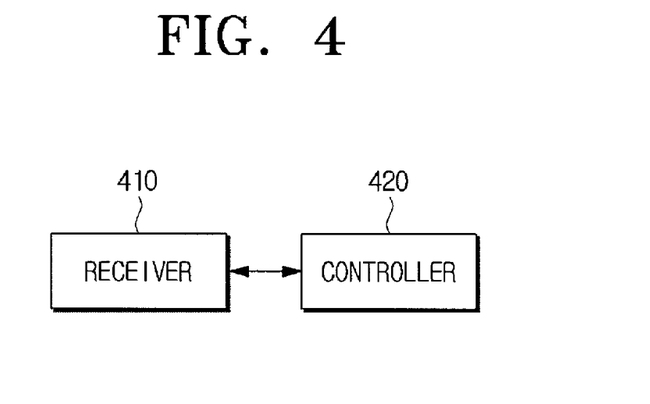
FIG. 4 is a block diagram showing a video apparatus according to another exemplary embodiment of the present invention.

As shown in FIG. 4, a video apparatus according to the other exemplary embodiment of the present invention comprises a receiver 410 and a controller 420.

The receiver 410 receives additional information from an external source. The controller 420 deletes characters satisfying specific conditions from the additional information received by the receiver 410, and then generates keywords. The controller 420 searches for information associated with the generated keywords.

Figure 5:
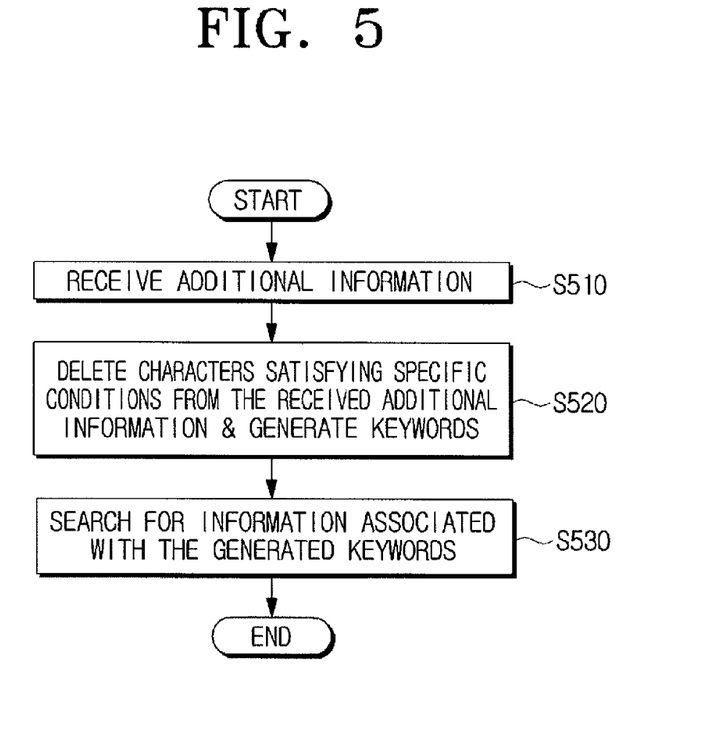
FIG. 5 is a flowchart explaining an automatic search method according to another exemplary embodiment of the present invention.

In a method for providing information in FIG. 5, the video apparatus receives additional information (S510). The video apparatus deletes characters satisfying specific conditions from the additional information received in operation S510, and then generates keywords (S520). The video apparatus then searches for information associated with the generated keywords (S530).

Therefore, it is possible to filter predetermined characters from the additional information, generate keywords for the broadcast program and search for information using the generated keywords.

As described above, according to the exemplary embodiments of the present invention, predetermined characters are filtered from additional information received from an external source
and keywords are generated using the filtered characters, so that searching for information may be performed using the generated keywords. Therefore, a user may acquire search results without needing to directly input keywords, and it is possible to prevent undesired information from being displayed as a search result.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An automatic search method performed by a video apparatus, the method comprising:
   receiving, by the video apparatus, a broadcast program including a video signal and an audio signal over a first medium;
   receiving, by the video apparatus, additional information;
   deleting, by a controller of the video apparatus, characters satisfying specific conditions from the received additional information, to generate keywords;
   searching for information associated with the generated keywords;
   processing, by a video processor of the video apparatus, the video signal; and
   outputting, by the video processor, a processed video signal directly to a video output unit without transmitting the processed video signal to the controller;
   wherein the additional information comprises information on the broadcast program, and the additional information is received over a second medium that is different than the first medium.

2. The method as claimed in claim 1, wherein the deleting comprises deleting characters which do not have a connection with a subject of the additional information from the additional information, and generating the keywords based on the additional information with deleted characters.

3. The method as claimed in claim 2, wherein the additional information comprises information on a broadcast program, and
   the deleting comprises deleting characters which do not have a connection with a title of the broadcast program from the additional information, and generating the keywords.

4. The method as claimed in claim 1, wherein the additional information comprises information contained in an event information table.

5. The method as claimed in claim 1, wherein the deleting comprises deleting at least one of special characters; alphanumeric characters arranged next to the special characters; alphanumeric characters between a pair of special characters; characters which may optionally be enclosed in parentheses indicating an image quality of the broadcast program; and characters indicating a start time of a broadcast program, from the additional information, and generating keywords.

6. The method as claimed in claim 5, wherein the image quality of the broadcast program is indicated by at least one of FULL high definition, high definition and standard definition.

7. The method as claimed in claim 1, wherein the searching comprises:
   generating a search request message containing the generated keywords;
   transmitting the search request message to a search server accessible via a network; and
   receiving a search result for the generated keywords from the search server.

8. The method as claimed in claim 7, wherein the network is the Internet, and
   the search server provides web pages for the searching.

9. The method as claimed in claim 8, wherein the receiving the additional information, the generating the keywords and the searching for the information are performed by a video apparatus, and
   the video apparatus functions as a web client with respect to the search server.

10. The method as claimed in claim 8, wherein the additional information comprises information on the broadcast program, and
    further comprising receiving the broadcast program through a medium different from the network.

11. A video apparatus comprising:
    a receiver which receives a broadcast program including a video signal and an audio signal, and additional information from an external source;
    a controller which deletes characters satisfying specific conditions from the additional information received by the receiver, to generate keywords, and searches for information associated with the generated keywords; and
    a video processor that processes the video signal and outputs a processed video signal directly to a video output unit without transmitting the processed video signal to the controller;
    wherein the receiver receives the broadcast program over a first medium;
    wherein the additional information comprises information on the broadcast program, and the additional information is received over a second medium that is different than the first medium.

12. The video apparatus as claimed in claim 11, wherein the controller deletes characters which do not have a connection with a subject of the additional information from the additional information, and generates the keywords based on the additional information with deleted characters.

13. The video apparatus as claimed in claim 12, wherein the additional information comprises information on a broadcast program, and
    the controller deletes characters which do not have a connection with a title of the broadcast program from the additional information, and generates the keywords.

14. The video apparatus as claimed in claim 11, wherein the additional information comprises information contained in an event information table.

15. The video apparatus as claimed in claim 11, wherein the controller deletes at least one of special characters; alphanumeric characters arranged next to the special characters; alphanumeric characters between a pair of special characters; characters which may optionally be enclosed in parentheses indicating an image quality of the broadcast program; and characters indicating the start time of a broadcast program, from the additional information, and generates keywords.

16. The video apparatus as claimed in claim 15, wherein the image quality of the broadcast program is indicated by at least one of FULL high definition, high definition and standard definition.

17. The video apparatus as claimed in claim 11, further comprising a communication interface which is communicably connected to an external network,
    wherein the controller generates a search request message containing the generated keywords, transmits the search request message to a search server accessible via the network connected to the communication interface, and receives a search result for the keyword from the search server.

18. The video apparatus as claimed in claim 17, wherein the network is the Internet, and
    the search server provides web pages for searching.

19. The video apparatus as claimed in claim 18, wherein the video apparatus functions as a web client with respect to the search server.

20. The video apparatus as claimed in claim 18, wherein the additional information comprises information on a broadcast program, and the video apparatus receives the broadcast program through a medium different from the network.

21. A non-transitory computer-readable medium having embodied thereon a computer program for executing an automatic search method, the program comprising:

receiving, by a video apparatus, a broadcast program including a video signal and an audio signal over a first medium receiving additional information;

deleting, by a controller of the video apparatus, characters satisfying specific conditions from the received additional information, to generate keywords;

searching for information associated with the generated keywords;

processing, by a video processor of the video apparatus, the video signal; and outputting, by the video processor, a processed video signal directly to a video output unit without transmitting the processed video signal to the controller;

wherein the additional information comprises information on the broadcast program, and the additional information is received over a second medium that is different than the first medium.

* * * * *